(12) United States Patent
Hipp et al.

(10) Patent No.: US 8,845,038 B2
(45) Date of Patent: Sep. 30, 2014

(54) PISTON PUMP FOR DELIVERING A FLUID, AND ASSOCIATED BRAKE SYSTEM

(75) Inventors: Josef Hipp, Seeg (DE); Beate Schumann, Boennigheim (DE); Horst Beling, Heilbronn (DE); Marc Zimmermann, Oberstenfeld (DE); Stefan Hallermann, Kempten (DE)

(73) Assignee: Robert Bosch GmbH, Stuttgart, DE (US)

( * ) Notice: Subject to any disclaimer, the term of this patent is extended or adjusted under 35 U.S.C. 154(b) by 653 days.

(21) Appl. No.: 12/680,962

(22) PCT Filed: Sep. 18, 2008

(86) PCT No.: PCT/EP2008/062451
§ 371 (c)(1),
(2), (4) Date: Mar. 31, 2010

(87) PCT Pub. No.: WO2009/043731
PCT Pub. Date: Apr. 9, 2009

(65) Prior Publication Data
US 2010/0232998 A1 Sep. 16, 2010

(30) Foreign Application Priority Data
Oct. 4, 2007 (DE) .......................... 10 2007 047 418

(51) Int. Cl.
*B60T 8/40* (2006.01)
*F04B 53/10* (2006.01)
*F04B 1/04* (2006.01)

(52) U.S. Cl.
CPC ..................... *F04B 53/10* (2013.01); *F04B 1/0452* (2013.01)
USPC ......................................... 303/116.4; 92/255

(58) Field of Classification Search
USPC ............... 417/545, 549, 547, 470; 303/116.4; 92/248, 255; 91/422
See application file for complete search history.

(56) References Cited

U.S. PATENT DOCUMENTS

| | | | |
|---|---|---|---|
| 5,823,639 A | 10/1998 | Zinnkann et al. | |
| 6,224,352 B1 * | 5/2001 | Hauser et al. | 417/313 |
| 6,276,909 B1 * | 8/2001 | Siegel et al. | 417/549 |
| 6,302,663 B1 * | 10/2001 | Schuller et al. | 417/554 |
| 6,471,496 B1 | 10/2002 | Merklein et al. | |

(Continued)

FOREIGN PATENT DOCUMENTS

DE 197 47 850 A1 2/1999

*Primary Examiner* — Bradley King
(74) *Attorney, Agent, or Firm* — Maginot, Moore & Beck

(57) ABSTRACT

A piston pump includes a piston assembly which has a first piston element, a second piston element, and at least one transverse bore which corresponds to a longitudinal bore. The piston pump further includes a cylinder in which the piston assembly is guided in a longitudinally movable manner, and an inlet valve which includes a cage element, in which an inlet valve spring and sealing element are arranged, and a corresponding inlet valve seat which is arranged on the piston assembly. The inlet valve sealing element can be pressed sealingly into the corresponding inlet valve seat by means of a restoring spring in order to close off the longitudinal bore. The second piston element is configured as a sleeve made of a wear-resistant material, which accommodates axially acting power components. The inlet valve seat is disposed on a bending edge of the second piston element configured as a sleeve. The at least one transverse bore corresponding to the longitudinal bore is placed in the second piston element. The invention further relates to an associated braking system.

19 Claims, 4 Drawing Sheets

(56) References Cited

U.S. PATENT DOCUMENTS

| | | | |
|---|---|---|---|
| 7,704,058 B2 * | 4/2010 | Harada et al. | 417/549 |
| 8,241,020 B2 * | 8/2012 | Zimmermann | 417/545 |
| 8,272,858 B2 * | 9/2012 | Bollwerk et al. | 417/547 |
| 2001/0002978 A1 * | 6/2001 | Siegel et al. | 417/470 |

* cited by examiner

PISTON PUMP FOR DELIVERING A FLUID, AND ASSOCIATED BRAKE SYSTEM

CROSS-REFERENCE TO RELATED APPLICATION

This application is a 35 USC 371 application of PCT/EP2008/062451 filed on Sep. 18, 2008.

BACKGROUND OF THE INVENTION

1. Field of the Invention

The invention is based on a piston pump for delivering a fluid, which is used in particular in brake systems of vehicles.

2. Description of the Prior Art

Such piston pumps are used in vehicles with hydraulic or electrohydraulic vehicle brake systems, preferably as return feed pumps, in order to raise or lower a brake pressure in the wheel brake cylinders selectively, as a result of which the brake pressure in the wheel brake cylinders can be regulated. Such regulation can be performed for instance in an anti-lock brake system (ABS), a traction control system (TC system), an electronic stability program system, and so forth. FIGS. 1 through 3 show a conventional piston pump, which is used in a vehicle brake system. As can be seen from FIGS. 1 through 3, a conventional piston pump 1 includes a piston assembly 2 that has a first piston element 2.1, having a sealing element 13; a second piston element 2.2; an inlet valve 5; an outlet valve 6; and a cylinder 8. The inlet valve 5 is embodied as a check valve and includes a cage element 11, in which an inlet valve spring 5.2 and an inlet valve sealing element 5.3 are disposed; the inlet valve sealing element 5.3 is embodied for instance as a sealing disk, which can cooperate sealingly with a corresponding inlet valve seat 5.1 that is disposed on the second piston element 2.2, and the second piston element 2.2 is connected to the cage element 11 by nonpositive engagement. The outlet valve 6 is likewise embodied as a spring-loaded check valve and is disposed in a cap element 12. The outlet valve 6 is opened when a pressure in a compression chamber 8.1 is greater than a spring force of an outlet valve spring 6.3, which force acts on an outlet valve sealing element 6.2 of the outlet valve 6, and as a result, the outlet valve sealing element 6.2 is pressed out of an outlet valve seat 6.1 disposed at an outlet opening 8.3 of the cylinder 8.

During an intake stroke of the piston assembly 2, fluid is aspirated radially via a filter sleeve 9 and transverse bores 3 disposed in the first piston element 2.1 and is carried, via the longitudinal bore 4, corresponding to the transverse bores 3, in the second piston element 2.2 and via the opened inlet valve 5 into the compression chamber 8.1, which is disposed in the cylinder 8 between the inlet valve 5 and the outlet valve 6. Once top dead center is reached, the direction of motion of the piston group 2 is reversed, so that the second piston element 2.2 having the inlet valve seat 5.1 is pressed sealingly against the inlet valve sealing element 5.3, via the first piston element 2.1 driven by an eccentric element 14 disposed in an eccentric chamber 15, and the inlet valve 5 is closed. Now, a pressure buildup takes place in the compression chamber 8.1 until such time as the pressure in the compression chamber 8.1 is greater than the spring force of the outlet valve 6, as a result of which the fluid that is under pressure is conducted via an outlet opening 8.3 and the opened outlet valve 6 from the compression chamber 8.1 into an outlet line, not shown.

Once bottom dead center is reached, the direction of motion of the piston assembly 2 reverses again, so that the outlet valve 6 closes again, and the intake stroke begins again; a restoring force F2 of a restoring spring 10, which is disposed in the compression chamber 8.1 and guided by a cylindrical wall 8.4 and which is embodied for instance as a spiral spring with polished end turns and which is braced on a cylinder bottom 8.2 and on the cage element 11, acts against the cage element 11 of the inlet valve 5 and thus against the second piston element 2.2 in order to move the piston assembly 2 back in the direction of top dead center again. Axial forces F1 and F2, which are respectively effected by the eccentric element 14 and introduced via the first piston element 2.1 and by the restoring spring 10 and introduced via the cage element 11, and radial forces F3, which are generated by the prevailing system pressure, act during operation on the second piston element 2.2 that bears the inlet valve seat 5.1. The second piston element 2.2 embodied as a valve seat must be produced as a stable component, preferably as a metal component, and can be weakened only conditionally by intake bores in the form of transverse bores. The transverse bores 3 are therefore made in the first piston element 2.1, resulting in a relatively long inlet region embodied as the longitudinal bore 4.

Advantages and Summary of the Invention

The piston pump of the invention has the advantage over the prior art that a second piston element of a piston assembly is embodied as a sleeve of a wear-resistant material that absorbs axially acting force components, and the inlet valve seat is disposed at a bending edge of the second piston element embodied as a sleeve, and the at least one transverse bore corresponding to the longitudinal bore is made in the second piston element. The second piston element embodied as a sleeve can be produced extremely inexpensively. Moreover, the inlet conduit embodied as a longitudinal bore can be made so extremely short and large that the flow resistance is advantageous reduced to a minimum. As a consequence, the piston pump of the invention can be filled faster, and as a result, better pressure buildup dynamics are attained, which is relevant particularly in a version as a stepped piston pump. All in all, the invention makes an economical piston pump possible that is optimized in terms of space and can be used for instance as a return feed pump in a brake system for a vehicle.

It is especially advantageous that the second piston element embodied as a sleeve can be produced in a deep-drawing process or a cold-forming process, and the least one transverse bore is stamped or drilled into the second piston element embodied as a sleeve. In a version as a deep-drawn part, a heat treatment can advantageously be dispensed with by means of cold-setting in the production process. As a rule, the inlet valve seat does not require postmachining. If needed, to increase the tightness, the inlet valve seat disposed at the bending edge can be restamped.

In a feature of the piston pump of the invention, a first piston element of the piston assembly can be embodied for instance as a cylindrical needle roll and is advantageously available as a standard part made by mass production. Since the driving force of an eccentric element is transmitted via a linear contact to the first piston element, embodied as a solid metal needle roll, preferably as a steel needle roll, wear can advantageously be reduced. For instance, the first piston element can be coupled loosely to the second piston element. Alternatively, the first piston element can be coupled to the second piston element by positive and/or nonpositive engagement. By the embodiment of the second piston element as a sleeve that can be produced by the deep-drawing process or cold-forming process, it is possible to make the inlet valve sealing seat, a form lock for solid coupling to the first piston element, and the at least one transverse bore and the corresponding longitudinal bore without metal-cutting machining.

The piston assembly of the invention can be embodied in a simple way in two stages by means of a suitable embodiment of the second piston element, embodied as a sleeve, and of the coupling to the first piston element without expensive insertion grinding.

In a further feature of the piston pump of the invention, a cage element has an elastic high-pressure sealing element, which is embodied for absorbing radially acting force components and sealing off from a cylindrical wall via a radial sealing face and for axially sealing off from a shoulder of the second piston element embodied as a sleeve via an axial sealing face. Since in contrast to the conventional piston pump, there is no longer any nonpositive engagement between the cage element having the high-pressure sealing element and the second piston element having the inlet valve seat, one assembly step is advantageously eliminated in the production of the piston pump of the invention. Moreover, stresses between the cage element and the second piston element are reduced by the elimination of the force lock, and the cage element with the elastic high-pressure sealing element can be embodied as plastic injection-molded parts. The embodiment as plastic injection-molded parts advantageously makes a simple, economical production of the component possible, and complex shaping is possible. The radial sealing face is shaped for instance by a pressure-dictated widening of the high-pressure sealing element. Overall, the piston pump of the invention makes an extreme cost reduction possible for the piston assembly as well as simple assembly. Moreover, the piston pump of the invention furnishes improved aspiration performance, greater pressure resistance, and an extremely short inlet region.

Advantageous embodiments of the invention, described below, as well as conventional exemplary embodiments described above for better comprehension of the invention, are shown in the drawings. In the drawings, the same reference numerals identify components and elements that perform identical or analogous functions.

BRIEF DESCRIPTION OF THE DRAWING

The invention is described in further detail below in conjunction with the accompanying drawings, in which.

DESCRIPTION OF THE PREFERRED EMBODIMENT

Figure 1:
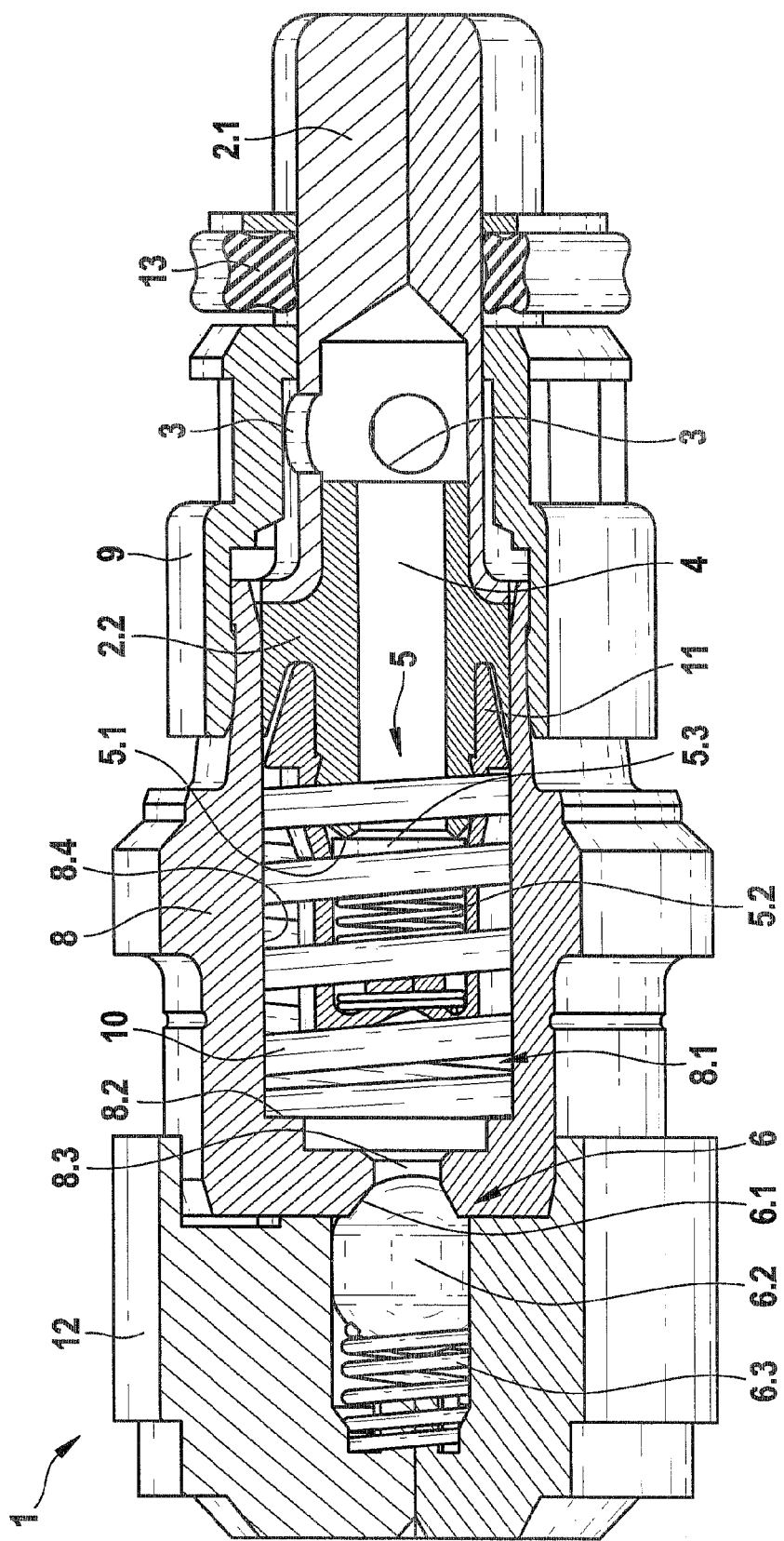
FIG. 1 shows a schematic perspective view of a conventional piston pump.
Figure 2:
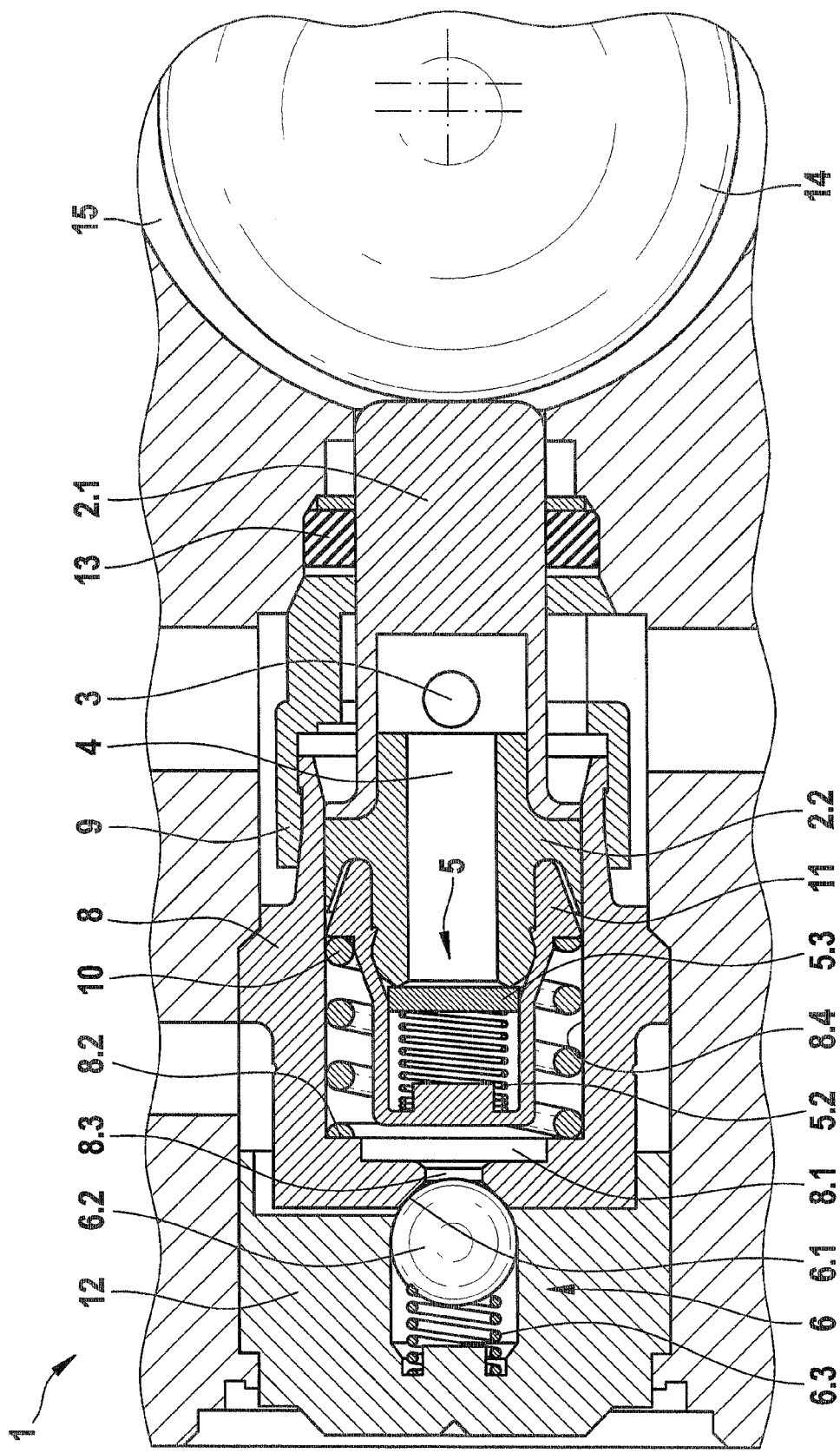
FIG. 2 shows a schematic sectional view of a conventional piston pump.
Figure 3:
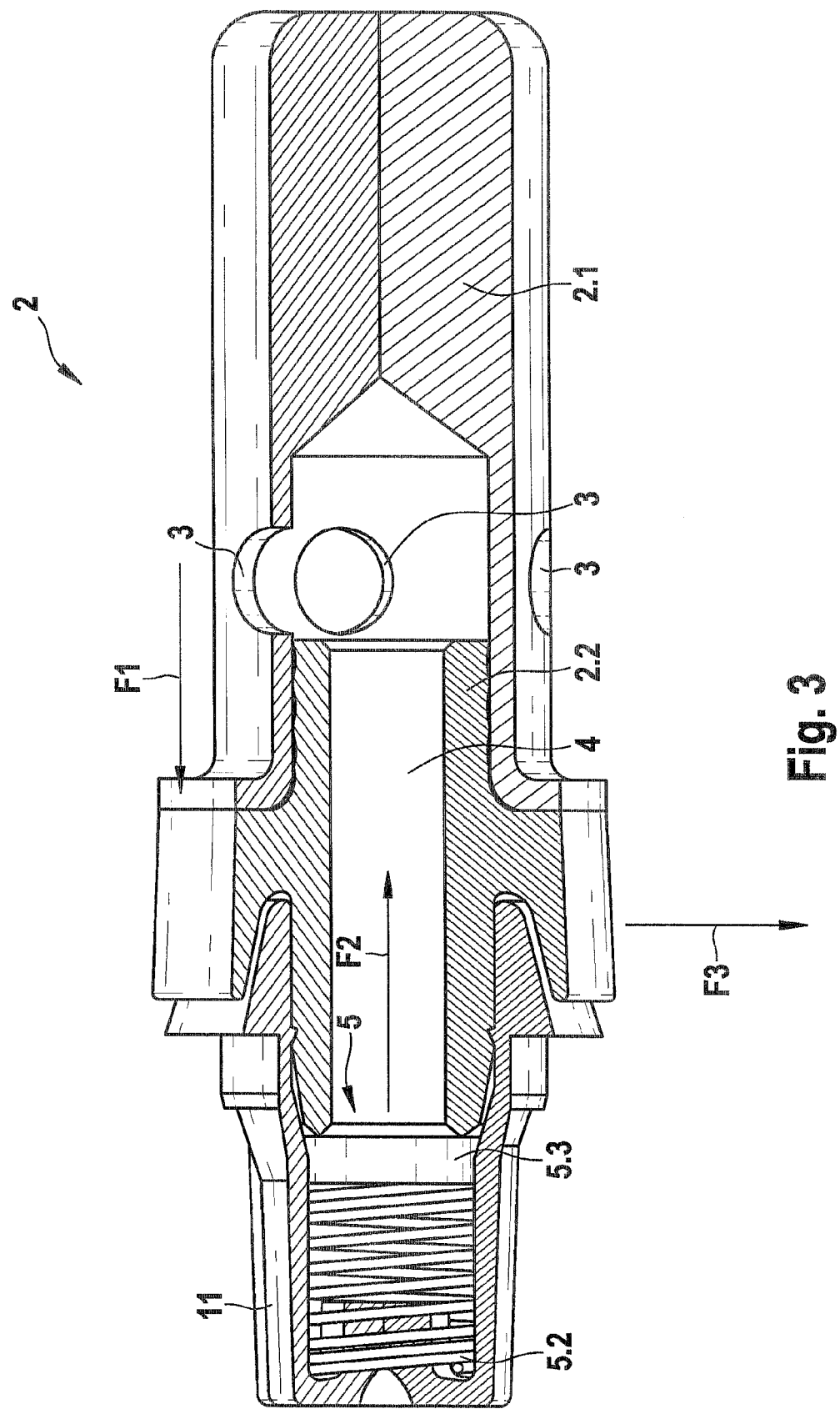
FIG. 3 shows a schematic perspective view of the components of an inlet valve for the conventional piston pump of FIG. 1 or FIG. 2.

A piston pump 21 of the invention, which can be used as a return feed pump in a vehicle brake system, includes essentially the same components as the conventional piston pump 1 described in conjunction with FIGS. 1 through 3. To avoid repetition, only the essential differences between the piston pump of the invention and the conventional piston pump 1 of FIGS. 1 through 3 will therefore be described in detail here. Unlike the conventional piston pump 1 of FIGS. 1 through 3, the piston pump of the invention includes an improved piston assembly in combination with a high-pressure sealing element.

Figure 4:
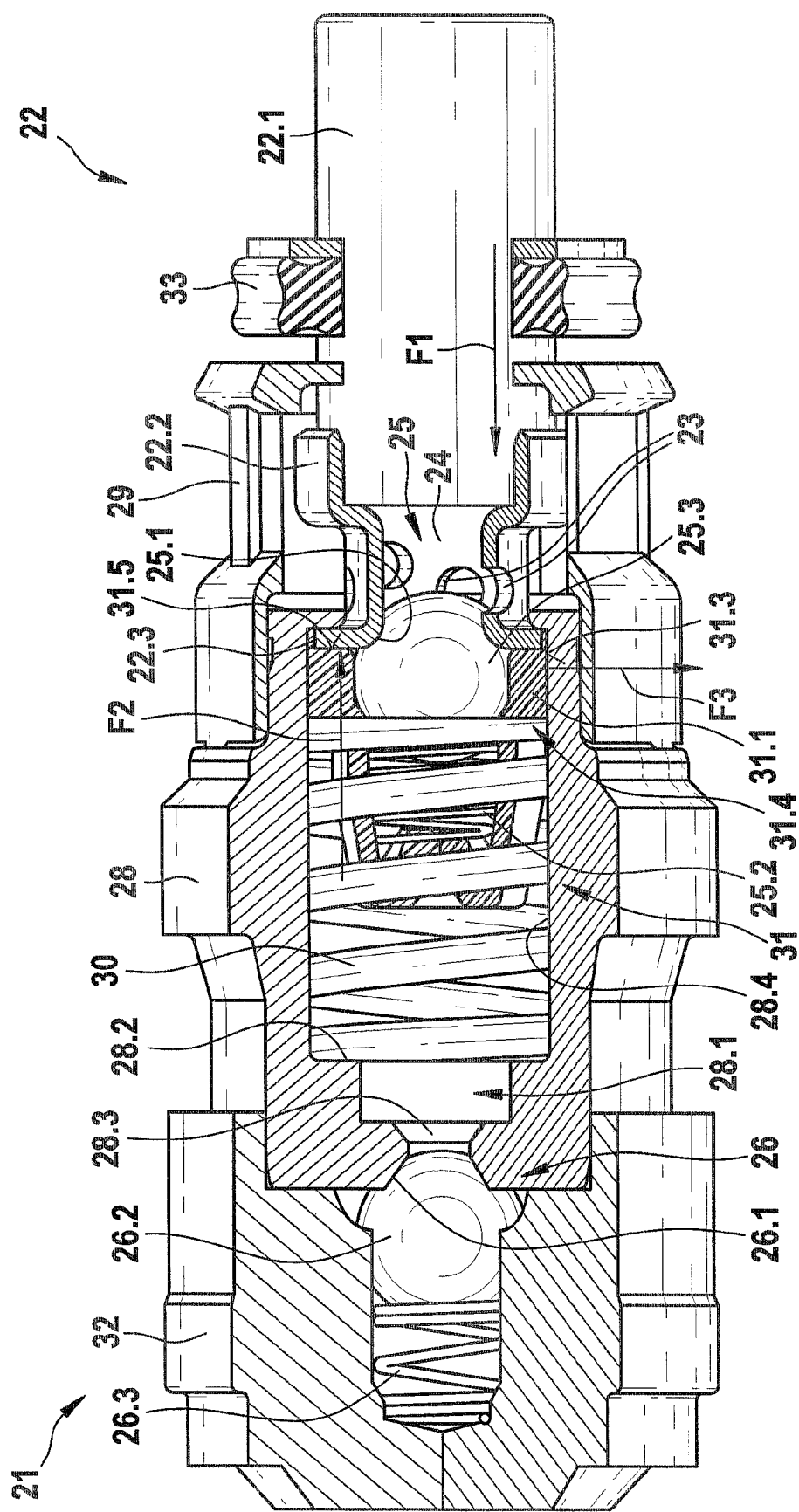
FIG. 4 shows a schematic perspective view of a piston pump of the invention.

As can be seen from FIG. 4, analogously to the conventional piston pump 1, the piston pump 21 of the invention has a piston assembly 22, an inlet valve 25, an outlet valve 26, and a cylinder 28. In a distinction from the conventional piston pump 1, a first piston element 22.1 of the piston assembly 22 is embodied in a distinction from the conventional piston pump 1 as a cylindrical needle roll, and a second piston element 22.2 of the piston assembly 22 is made as a sleeve of a wear-resistant material by a deep-drawing process or a cold-forming process. The inlet valve 25 of the piston pump 21 of the invention is embodied as a check valve, and analogously to the conventional piston pump 1, it includes a cage element 31, in which an inlet valve spring 25.2 and an inlet valve sealing element 25.3 embodied for instance as a sealing ball are disposed, and a corresponding inlet valve seat 25.1, which is disposed at a bending edge of the second piston element 22.2 embodied as a sleeve; a plurality of transverse bores 23, corresponding with a longitudinal bore 24, are stamped or drilled into the second piston element 22.2. To improve the tightness, the inlet valve seat 25.1 disposed at the bending edge of the second piston element 22.2 can be restamped. The inlet valve sealing element 25.3 is pressed sealingly into the corresponding inlet valve seat 25.1 by a spring force of the inlet valve spring 25.2. In a distinction from the conventional piston pump 1, the cage element 31 of the piston pump 21 of the invention has an elastic high-pressure sealing element 31.1, which is embodied to absorb radially acting force components F3 and, via a radial sealing face 31.3, to seal off from a cylindrical wall 28.4 and, via an axial sealing face 31.5, to seal axially off from a shoulder 2.3 of the second piston element 22.2, which rests on the axial sealing face 31.5.

In a distinction from the conventional piston pump 1, the second piston element 22.2 now absorbs only the axially acting force components F1 and F2, so that in the second piston element 22.2, the longitudinal bore 24 and the transverse bores 23 corresponding to the longitudinal bore 24 can be made without a loss of strength. In the exemplary embodiment shown, the cage element 31 with the elastic high-pressure sealing element 31.1 is embodied as plastic injection-molded parts, as a result of which simple, economical production of the component is advantageously made possible, and convex shaping is possible. Moreover, the first piston element 22.1 in the exemplary embodiment shown is solidly coupled to the second piston element 22.2 and has a sealing element 33. In an embodiment not shown, the first piston element 22.1 can be coupled loosely to the second piston element 22.2. Overall, the embodiment according to the invention of the piston assembly 22, in combination with the high-pressure sealing element 31.1, makes an extreme cost reduction of the piston pump 21 and simple assembly possible. Moreover, the inlet conduit embodied as a longitudinal bore 24 can be made so extremely short and large that the flow resistance can advantageously be reduced to a minimum. As consequence, the piston pump 21 of the invention can be filled faster, and as a result, better pressure buildup dynamics are achieved.

The outlet valve 26 is likewise embodied as a spring-loaded check valve and is disposed in a cap element 32. The outlet valve 26 is opened when a pressure in a compression chamber 28.1 is greater than a spring force, acting on an outlet valve sealing element 26.2 of the outlet valve 26, of an outlet valve spring 26.3, as a result of which the outlet valve sealing element 26.2 is pressed out of an outlet valve seat 26.1 disposed at an outlet opening 28.3 of the cylinder 28.

As can also be seen from FIG. 4, the piston assembly 22 with the inlet valve 25 is guided longitudinally movably in the cylinder 28, and during an intake stroke of the piston assembly 22, fluid is radially aspirated via a filter sleeve 29 through the transverse bores 23 in the second piston element 22.2 and is carried, via the longitudinal bore 24 corresponding to the transverse bores 23, through the open inlet valve 25 into the compression chamber 28.1. Once top dead center is reached, the direction of motion of the piston assembly 22 reverses, so that the second piston element 22.2 with the inlet valve seat 25.1 is pressed sealingly against the inlet valve sealing element 25.3 via the first piston element 22.1, driven by an eccentric element not shown, and the inlet valve 25 is closed. Now, a pressure buildup takes place in the compression chamber 28.1 until such time as the pressure in the compression chamber 28.1 is greater than the spring force of the outlet valve 26, as a result of which the fluid that is under pressure is conducted, via the outlet opening 28.3 and the open outlet valve 26, out of the compression chamber 28.1 into an outlet line, not shown.

Once bottom dead center is reached, the direction of motion of the piston assembly 22 reverses again, so that the outlet valve 26 closes again and the intake stroke begins again; a restoring force F2 of a restoring spring 30, which is disposed in the compression chamber 28.1 and embodied for instance as a spiral spring and which is braced on a cylinder bottom 28.2, has an axially acting force component F2 which presses against a radial receiving region 31.4, which is disposed on the high-pressure sealing element 31.1. The restoring force component F2 acts axially on the shoulder 22.3 of the second piston element 22.2, via the high-pressure sealing element 31.1 and the axial sealing face 31.5, and as a result, the piston assembly 22 moves back in the direction of top dead center.

Since the elastic high-pressure sealing element 31.1 is disposed between the metal restoring spring 30 and the second piston element 22.2 that is made from a wear-resistant and thus hard material, the radial sealing face 31.3 is widened because of pressure, so that the high-pressure sealing element 31.1 rests with its full radial outside diameter sealingly on the cylindrical wall 28.4. During the compression of the fluid aspirated into the compression chamber 28.1, the high-pressure sealing element 31.1 seals radially off from the cylindrical wall 28.4, via the radial sealing face 31.3, and off from the shoulder 22.3 of the second piston element 22.2, by means of the axial sealing face 31.5. In addition, the inlet valve sealing element 25.3 seals off axially off from the inlet valve seat 25.1 in the second piston element 22.2.

The piston pump of the invention advantageously includes many components which can be produced quite simply and inexpensively. Moreover, the flow resistance can advantageously be reduced to a minimum, as hence the piston pump of the invention can be filled faster and as a result better pressure buildup dynamics can be achieved. Overall, the invention makes a piston pump possible that is inexpensive and optimized in terms of space and that can be used for instance as a return feed pump in a brake system for a vehicle.

The foregoing relates to the preferred exemplary embodiment of the invention, it being understood that other variants and embodiments thereof are possible within the spirit and scope of the invention, the latter being defined by the appended claims.

The invention claimed is:

1. A piston pump, comprising:
 a piston assembly, which includes:
  a first piston element, and
  a second piston element having (i) a first hollow region with at least one transverse bore and a longitudinal bore corresponding to the at least one transverse bore, (ii) a shoulder extending radially outwardly from an end of the first hollow region, and (iii) an inlet valve seat defined at a bending edge formed at an intersection of the shoulder and the end of the first hollow region;
 a cylinder, in which the piston assembly is guided longitudinally movably; and
 an inlet valve, which includes a cage element in which an inlet valve spring and an inlet valve sealing element are disposed,
 wherein a spring force of the inlet valve spring urges the inlet valve sealing element to seal with the inlet valve seat to close the longitudinal bore, and via the at least one transverse bore of the first hollow region, fluid is aspirated and conducted through the longitudinal bore via the inlet valve into a compression chamber in which a restoring spring for the piston assembly is disposed,
 wherein the second piston element is embodied as a thin-walled sleeve surrounding a portion of the first piston element and being configured to absorb axially acting force components from the first piston element and the cage element, and
 wherein the first piston element has a first axial length, the second piston element has a second axial length, and the second axial length is less than the first axial length.

2. The piston pump as defined by claim 1, wherein the second piston element is hollow along an entire axial length of the second piston element.

3. The piston pump as defined by claim 1, wherein the second piston element is produced in a deep-drawing process or a cold-forming process, and the least one transverse bore is stamped or drilled into the second piston element.

4. The piston pump as defined by claim 1, wherein the inlet valve seat is restamped.

5. The piston pump as defined by claim 1, wherein the first piston element is embodied as a solid right cylinder.

6. The piston pump as defined by claim 3, wherein the first piston element is embodied as a solid right cylinder.

7. The piston pump as defined by claim 4, wherein the first piston element is embodied as a solid right cylinder.

8. The piston pump as defined by claim 1, wherein the first piston element is coupled loosely to the second piston element.

9. The piston pump as defined by claim 6, wherein the first piston element is coupled loosely to the second piston element.

10. The piston pump as defined by claim 1, wherein the first piston element is coupled by positive and/or nonpositive engagement to the second piston element.

11. The piston pump as defined by claim 1, wherein:
 the cage element has an elastic high-pressure sealing element having a radial sealing face and an axial sealing face, and
 the elastic high-pressure sealing element is configured to (i) absorb radially acting force components to seal the radial sealing face against a cylindrical wall of the cylinder and (ii) axially seal the axial sealing face against the shoulder of the second piston element.

12. The piston pump as defined by claim 6, wherein:
 the cage element has an elastic high-pressure sealing element having a radial sealing face and an axial sealing face, and
 the elastic high-pressure sealing element is configured to (i) absorb radially acting force components to seal the radial sealing face against a cylindrical wall of the cylinder and (ii) axially seal the axial sealing face against the shoulder of the second piston element.

13. The piston pump as defined by claim 11, wherein the radial sealing face is shaped by a pressure-dictated widening of the high-pressure sealing element.

14. The piston pump as defined by claim 11, wherein the cage element having the elastic high-pressure sealing element is embodied as a plastic injection-molded part.

15. The piston pump as defined by claim 5, wherein:
the first piston element has a terminal end surface and defines an outer radius; and
the second piston element includes a second hollow region that defines a first inner radius, which is substantially equal to the outer radius of the first piston element such that a portion of the first piston element fits into the second hollow region.

16. The piston pump as defined by claim 15, wherein:
the first hollow region of the second piston element has a second inner radius, which is less than the first inner radius; and
the second piston element further comprises a ledge between the first hollow region and the second hollow region against which the terminal end surface of the first piston element rests.

17. The piston pump as defined by claim 1, wherein the second piston element has a uniform wall thickness.

18. A brake system for a vehicle, comprising:
a return feed pump which is embodied as a piston pump having:
a piston assembly, which includes:
a first piston element, and
a second piston element having (i) a hollow region with at least one transverse bore and a longitudinal bore corresponding to the at least one transverse bore, (ii) a shoulder extending radially outwardly from an end of the hollow region, and (iii) an inlet valve seat defined at a bending edge formed at an intersection of the shoulder and the end of the hollow region;
a cylinder, in which the piston assembly is guided longitudinally movably; and
an inlet valve, which includes a cage element in which an inlet valve spring and an inlet valve sealing element are disposed,
wherein a spring force of the inlet valve spring urges the inlet valve sealing element to seal with the inlet valve seat to close the longitudinal bore, and via the at least one transverse bore of the hollow cylindrical region, fluid is aspirated and conducted through the longitudinal bore via the inlet valve into a compression chamber in which a restoring spring for the piston assembly is disposed,
wherein the second piston element is embodied as a thin-walled sleeve surrounding a portion of the first piston element and being configured to absorb axially acting force components from the first piston element and the cage element, and
wherein the first piston element has a first axial length, the second piston element has a second axial length, and the second axial length is less than the first axial length.

19. A brake system for a vehicle comprising:
a return feed pump which is embodied as a piston pump having:
a piston assembly, which includes:
a first piston element, and
a second piston element having at least one transverse bore, a longitudinal bore corresponding to the at least one transverse bore, and a shoulder extending radially outwardly from the second piston element at an end of the longitudinal bore, the shoulder defining an inlet valve seat at an intersection of the shoulder and the end of the longitudinal bore;
a cylinder, in which the piston assembly is guided longitudinally movably; and
an inlet valve, which includes a cage element in which an inlet valve spring and an inlet valve sealing element are disposed,
wherein a spring force of the inlet valve spring urges the inlet valve sealing element to seal with the inlet valve seat to close the longitudinal bore, and via the at least one transverse bore of the hollow cylindrical region, fluid is aspirated and conducted through the longitudinal bore via the inlet valve into a compression chamber in which a restoring spring for the piston assembly is disposed,
wherein the second piston element is embodied as a thin-walled sleeve surrounding a portion of the first piston element and is configured to absorb axially acting force components from the first piston element and the cage element,
wherein the second piston element is produced in a deep-drawing process or a cold-forming process, and the least one transverse bore is stamped or drilled into the second piston element,
wherein the inlet valve seat is restamped,
wherein the first piston element is embodied as a solid right cylinder,
wherein the first piston element is coupled loosely to the second piston element, and
wherein the first piston element has a first axial length, the second piston element has a second axial length, and the second axial length is less than the first axial length.

* * * * *